US010296118B2

(12) United States Patent
Song et al.

(10) Patent No.: US 10,296,118 B2
(45) Date of Patent: May 21, 2019

(54) TOUCH DISPLAY SUBSTRATE AND TOUCH DISPLAY DEVICE

(71) Applicants: BOE Technology Group Co., Ltd., Beijing (CN); Hefei BOE Optoelectronics Technology Co., Ltd., Anhui (CN)

(72) Inventors: Jie Song, Beijing (CN); Qiyu Shen, Beijing (CN); Na Zhao, Beijing (CN); Xufei Xu, Beijing (CN); Gaofei Shi, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 18 days.

(21) Appl. No.: 15/531,072

(22) PCT Filed: Jun. 24, 2016

(86) PCT No.: PCT/CN2016/086990
§ 371 (c)(1),
(2) Date: May 26, 2017

(87) PCT Pub. No.: WO2017/161719
PCT Pub. Date: Sep. 28, 2017

(65) Prior Publication Data

US 2018/0046290 A1 Feb. 15, 2018

(30) Foreign Application Priority Data

Mar. 21, 2016 (CN) .......................... 2016 1 0162059

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04112* (2013.01)

(58) Field of Classification Search
CPC .... G06F 3/044; G06F 3/0416; G06F 3/03547; G06F 3/041; G06F 3/0412; G06F 2203/04111

(Continued)

(56) References Cited

U.S. PATENT DOCUMENTS 9,013,642 B2 4/2015 Ishizaki et al.
9,304,637 B2 4/2016 Huang (Continued)

FOREIGN PATENT DOCUMENTS

CN 101727228 A 6/2010
CN 101814256 A 8/2010

(Continued)

OTHER PUBLICATIONS

International Search Report and Written Opinion for International Application No. PCT/CN2016/086990, dated Dec. 22, 2016, 8 pages.

(Continued)

*Primary Examiner* — Koosha Sharifi-Tafreshi
(74) *Attorney, Agent, or Firm* — Westman, Champlin & Koehler, P.A.

(57) ABSTRACT

The present disclosure provides a touch display substrate and a touch display device, relates to a display field and solves a technical problem of lower sensibility of the touch display device. The touch display substrate comprises a plurality of touch electrodes, wherein the plurality of touch electrodes are divided into at least one touch electrode pair; each of the touch electrode pair includes first and second touch electrodes which are adjacent to each other; the first (Continued)

touch electrode comprises a first bending portion; the second touch electrode comprises second bending portion; and the second bending portions correspond to the first bending portions at positions. The touch display substrate according to the present disclosure may be applied to the touch display device.

13 Claims, 5 Drawing Sheets

(58) Field of Classification Search
USPC .................................................. 345/173, 174
See application file for complete search history.

(56) References Cited

U.S. PATENT DOCUMENTS

| | | | | |
|---|---|---|---|---|
| 9,459,718 | B2 | 10/2016 | Ishizaki et al. | |
| 9,791,951 | B2 | 10/2017 | Ishizaki et al. | |
| 9,846,499 | B2 | 12/2017 | Chen et al. | |
| 2011/0134055 | A1* | 6/2011 | Jung | G06F 3/044 345/173 |
| 2012/0256642 | A1* | 10/2012 | Badaye | G06F 3/044 324/658 |
| 2013/0100038 | A1* | 4/2013 | Yilmaz | G06F 3/044 345/173 |
| 2014/0049505 | A1* | 2/2014 | Radivojevic | G06F 3/04883 345/174 |
| 2014/0055689 | A1* | 2/2014 | Lu | G06F 3/044 349/12 |
| 2014/0061597 | A1* | 3/2014 | Choi | H01L 51/5284 257/40 |
| 2014/0160368 | A1 | 6/2014 | Huang | |
| 2015/0004760 | A1* | 1/2015 | Kim | G02F 1/13338 438/158 |
| 2015/0346889 | A1 | 12/2015 | Chen et al. | |
| 2016/0291776 | A1* | 10/2016 | Li | G06F 3/0416 |

FOREIGN PATENT DOCUMENTS

| | | | |
|---|---|---|---|
| CN | 202306523 | U | 7/2012 |
| CN | 202711219 | U | 1/2013 |
| CN | 103268176 | A | 8/2013 |
| CN | 203241971 | U | 10/2013 |
| CN | 103576955 | A | 2/2014 |
| CN | 105094497 | A | 11/2015 |
| CN | 204790951 | U | 11/2015 |
| CN | 105335031 | A | 2/2016 |

OTHER PUBLICATIONS

English translation of International Search Report and Written Opinion for International Application No. PCT/CN2016/086990, 11 pages.

First Office Action, including Search Report, for Chinese Patent Application No. 201610162059.X, dated Feb. 24, 2018, 23 pages.

* cited by examiner

TOUCH DISPLAY SUBSTRATE AND TOUCH DISPLAY DEVICE

CROSS-REFERENCE TO RELATED APPLICATION(S)

This application is a Section 371 National Stage Application of International Application No. PCT/CN2016/086990, filed on 24 Jun. 2016, which has not yet published, and claims priority to Chinese Application with an application number of 201610162059.x, filed on Mar. 21, 2016 and entitled “Touch display substrate and touch display device”, which are incorporated herein by reference in their entirety.

TECHNICAL FIELD

The present disclosure relates to a technical field of display, and more particularly to a touch display substrate and a touch display apparatus.

BACKGROUND

At present, a touch display device mainly performs a touch function by a touch screen superimposed on a surface of a display panel. The overall structure of the touch display device having the above-described structure is thick, and can’t meet the user’s demand of thinning for the touch display device.

In order to make the touch display device thinner, there is provided in the prior art a touch display device formed by integrating a touch electrode having a touch function into a display panel. Exemplarily, the touch display device comprises a plurality of common electrode blocks arranged in an array. The common electrode block is used as a common electrode for display during a display period, and is multiplexed as a touch electrode for touch during a touch period. By way of example, when a touching principle of the touch display device is to utilize a self-capacitance mode, the touch electrode is a self-capacitance electrode, and when the touching principle of the touch display device is to utilize a mutual capacitance mode, the touch electrode includes a driving electrode And a receiving electrode.

However, the inventors of the present application have found that in the touch display device having the above-described structure, an overlapping area of two adjacent touch electrodes is small so that the user’s touch has a small influence on a capacitance formed by the two adjacent touch electrodes, and in turn the touch display device has a lower sensitivity.

SUMMARY

It is an object of the present disclosure to provide a touch display substrate and a touch display device for improving a sensitivity of the touch display device.

In order to implement the above object, the present disclosure provides a touch display substrate comprising a plurality of touch electrodes, the plurality of touch electrodes being divided into at least one touch electrode pair; each of the touch electrode pair includes first and second touch electrodes which are adjacent to each other; the first touch electrode comprises a plurality of bending portions; the second touch electrode comprises a plurality of bending portions; the bending portions of the first touch electrode and the corresponding burking portions of the second touch electrode are matched with each other at positions.

The touch display substrate provided by the present disclosure has the structure as mentioned above. The touch display substrate comprises a plurality of touch electrodes divided into at least one touch electrode pair, and each of the touch electrode pair includes a first touch electrode and a second touch electrode which are adjacent to each other; the first touch electrode comprises a plurality of bending portions; the second touch electrode comprises a plurality of bending portions; and the bending portions of the first touch electrode and the corresponding bending portions of the second touch electrode are matched with each other at positions. As compared with the prior art, since the first touch electrode and the second touch electrode of the present disclosure have a greater opposite overlapping area, the user’s touch has a great influence on the capacitance formed by the first touch electrode and the second touch electrode. When the touch display substrate is applied to the touch display device, the sensitivity of the touch display device may be effectively improved.

In addition, the present disclosure also provides a touch display device including the touch display substrate as mentioned above.

Since the touch display device includes the touch display substrate as mentioned, the touch display device has the same advantageous effects as that of the above mentioned touch display substrate, so it is omitted for brevity.

BRIEF DESCRIPTION OF THE DRAWINGS

In order to more clearly illustrate the embodiments of the present disclosure or the technical solutions in the prior art, the following drawings, which are intended to be used in the description of the examples, are briefly described. It will be apparent that the drawings in the following description are merely illustrative of the present disclosure. In some embodiments, other drawings may be obtained by those skilled in the art without inventive labors.

DETAILED DESCRIPTION

The embodiments described in the embodiments of the present disclosure will now be described in conjunction with the accompanying drawings in the embodiments of the present disclosure. It will be apparent that the described embodiments are part of the embodiments of the present disclosure and are no all of the embodiments. Other embodiments may be obtained by those skilled in the art on the basis of the present invention and without inventive labors fall within the scope of the present disclosure.

Figure 1:
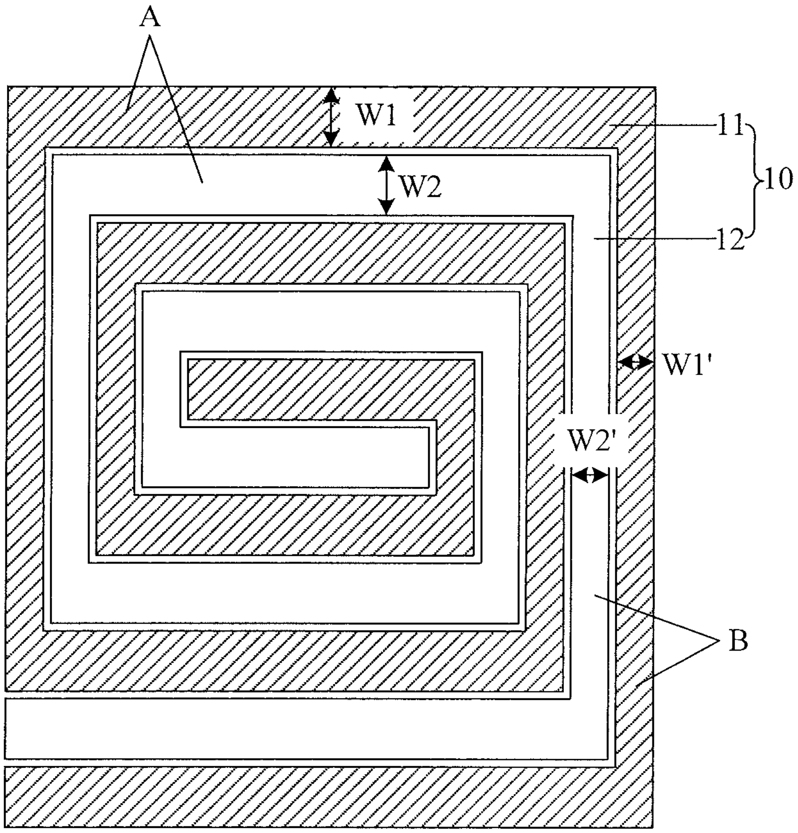
FIG. 1 is a plan view of a touch electrode pair in an embodiment of the present disclosure.
Figure 2:
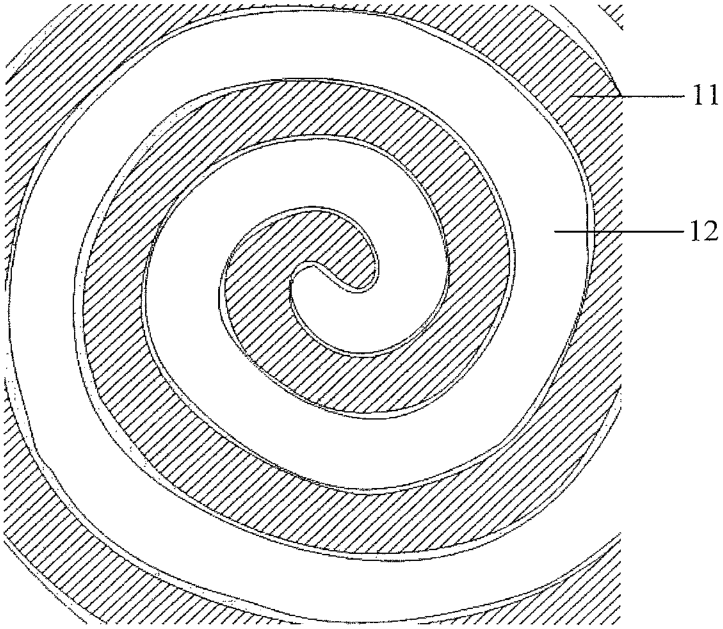
FIG. 2 is a plan view of the touch electrode pair in the embodiment of the present disclosure.

The embodiment of the present disclosure provides a touch display substrate. The touch display substrate comprises a plurality of touch electrodes, and the plurality of touch electrodes are divided into at least one touch electrode pair. Each of the touch electrode pair includes first and second touch electrodes which are adjacent to each other; the first touch electrode comprises a plurality of bending portions; the second touch electrode comprises a plurality of bending portions; and the bending portions of the first touch electrode and the corresponding bending portions of the second touch electrode are matched with each other at positions. In the following examples, the bending portion may be taken as an example in which the first touch electrode includes a first bending portion and the second touch electrode 12 includes a second bending portion. It should be understood that the touch electrode may include a plurality of bending portions. As shown in FIGS. 1 and 2, each touch electrode pair 10 includes a first touch electrode 11 and a second touch electrode 12 which are adjacent to each other, the first touch electrode 11 includes a first bending portion, the second touch electrode 12 includes a second bending portion, and the second bending portion corresponds to the first bending portion at positions.

The touch display substrate provided by the present disclosure has the structure as mentioned above. The touch display substrate comprises a plurality of touch electrodes divided into at least one touch electrode pair 10, and each of the touch electrode pair 10 includes a first touch electrode 11 and a second touch electrode 12 which are adjacent to each other; the first touch electrode 11 comprises a plurality of bending portions; the second touch electrode 12 comprises a plurality of bending portions; and the second bending portion corresponds to the first bending portion at positions. As compared with the prior art, the first touch electrode 11 and the second touch electrode 12 of the present disclosure have a greater opposite overlapping area, so that the user's touch has a great influence on the capacitance formed by the first touch electrode 11 and the second touch electrode 12, and when the touch display substrate is applied to the touch display device, the sensitivity of the touch display device may be effectively improved.

Figure 3:
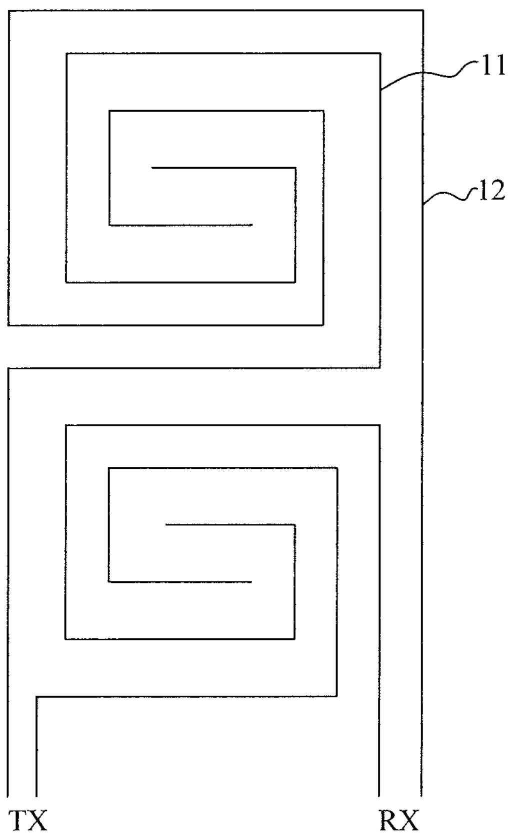
FIG. 3 is a plan view of the touch electrode pair in the embodiment of the present disclosure.

In addition, for the touch display substrate having the above structure, it only needs to change the signal input to the respective touch electrodes so that the first touch electrode 11 and the second touch electrode 12 in each of the touch electrode pair becomes are self-capacitive electrodes. As shown in FIG. 3, the first touch electrode 11 in each touch electrode pair 10 is a driving electrode Tx and the second touch electrode 12 is the receiving electrode Rx, and therefore, the touch display substrate may be applied more flexibly. As shown in FIGS. 1 and 2, when the first touch electrode 11 and the second touch electrode 12 in each touch electrode pair 10 are self-capacitance electrodes, the touch display substrate may be applied to the touch display device operated in a self-capacitance mode. As shown in FIG. 3, when the first touch electrode 11 in each touch electrode pair 10 is a driving electrode Tx and the second touch electrode 12 is a receiving electrode Rx, the touch display substrate may be applied to a touch display device operated in a mutual capacitance mode.

It should be noted that an area occupied by each of the touch electrode pair 10 in the embodiment of the present disclosure may be the same as or similar to that of (usually 3 mm×3 mm) of one touch point so that the manufacturing method of the touch electrode is simple and the requirements for the touch driver circuit are low; or the area occupied by the plurality of adjacent touch electrode pairs 10 is the same as or similar to that of one touch point to improve the accuracy of the touch display device and further improve the sensitivity of the touch display device. Furthermore, since the touch electrode bypasses a position of the data line and is not overlapped with the data line, it may effectively reduce influence of the transmitting capacitance in the touch unit on the data line.

The embodiments of the present disclosure illustrate a specific structure of the first touch electrode 11 and the second touch electrode 12 in the touch electrode pair 10 in order to facilitate understanding and implementation by those skilled in the art. It should be noted that the specific structure of the first touch electrode 11 and the second touch electrode 12 is not limited thereto. Those skilled in the art will be able to obtain other specific structures based on the following and it will not be described further herein for brevity.

Exemplarily, as shown in FIG. 1 and FIG. 2, both of the first touch electrode 11 and the second touch electrode 12 are in a spiral shape, and the first touch electrode 11 and the second touch electrode 12 are overlapped with each other in a nested manner. Those skilled in the art may set the number of turns in which the first touch electrode 11 and the second touch electrode 12 are overlapped with each other in a nested manner according to actual situations. Exemplarily, the actual situation as described above may be the size of the touch electrode pair 10, the width of the first touch electrode 11 and the second touch electrode 12, and the requirement on the sensitivity of the touch display device.

At this time, the opposite overlap area of the first touch electrode 11 and the second touch electrode 12 is much larger than that of the two adjacent touch electrodes in the prior art, and even if the area occupied by the touch electrode pair 10 in the embodiment of the present disclosure is larger than that of the two adjacent touch electrodes in the prior art, the touch display device still has a higher sensitivity. Therefore, the embodiment of the present disclosure may make the area occupied by the touch electrode pair 10 be larger than that of the two adjacent touch electrodes in the prior art while it is ensured that the touch display device has a high sensitivity, so as to reduce the number of wires used to provide a signal to the touch electrode, thereby reducing the requirements of the touch drive circuit and difficult of wiring.

It should be understood that the larger opposite overlapping area of the first touch electrode 11 and the second touch electrode 12 described in the present specification represents the overlapping situation in which in the same planar wiring pattern, the first touch electrode 11 and the two touch electrodes are arranged adjacent to each other. For example, when the first touch electrode 11 and the second touch electrode 12 are nested in overlapping concentric spiral shapes in a concentric manner, the first touch electrode 11 and the second touch electrode 12 may be wired in an overlapping shape of "回" and such an arrangement of the touch electrode is a single layer wiring arrangement.

Specifically, as shown in FIG. 1, the first touch electrode 11 may be a square spiral shape, and the second touch electrode 12 may also be a square spiral shape, and the first touch electrode 11 and the second touch electrode 12 are overlapped with each other in a nested manner; the first touch electrode 11 may be a circular spiral shape, and the second touch electrode 12 may also be a circular spiral shape, and the first touch electrode 11 and the second touch electrode 12 are overlapped with each other in a nested manner.

Among others, when the first touch electrode 11 and the second touch electrode 12 both are square spiral shapes and the first touch electrode 11 and the second touch electrode 12 are overlapped with each other in a nested manner, the touch electrode pair 10 constituted by the first touch electrode 11 and the second touch electrode 11 has a rectangular shape and the respective touch electrode pairs 10 may be closely arranged to cover the entire touch display substrate. In the embodiment of the present disclosure, as shown in FIG. 1, the first touch electrode 11 has a square spiral shape, the second touch electrode 12 also has a square spiral shape, and the first touch electrode 11 and the second touch electrodes 12 are overlapped with each other in a nested manner. At this time, the first touch electrode 11 and the second touch electrode 12 both include a plurality of first strip structures A and a plurality of second strip structures B extending along directions perpendicular to each other; the plurality of first stripe structures A and the plurality of second stripe structures B included in the first touch electrodes 11 are alternately connected to each other end to end to form a square helical shape, and the plurality of first stripe structures A and the plurality of second stripe structures B included in the second touch electrodes 12 are alternately connected to each other end to end to form a square helical shape.

Furthermore, in the embodiment of the present disclosure, as shown in FIG. 1, a width W1 of the first stripe structure A included in the first touch electrode 11 is identical to a width W2 of the first stripe structure A included in the second touch electrode 12, and a width W1' of the second stripe structure B included in the first touch electrode 11 is identical to a width W2' of the second stripe structure B included in the second touch electrode 12, so that the design mode of the touch electrode is simple and the touch display device has the same sensitivity at different positions along the row direction and along the column direction.

Figure 4:
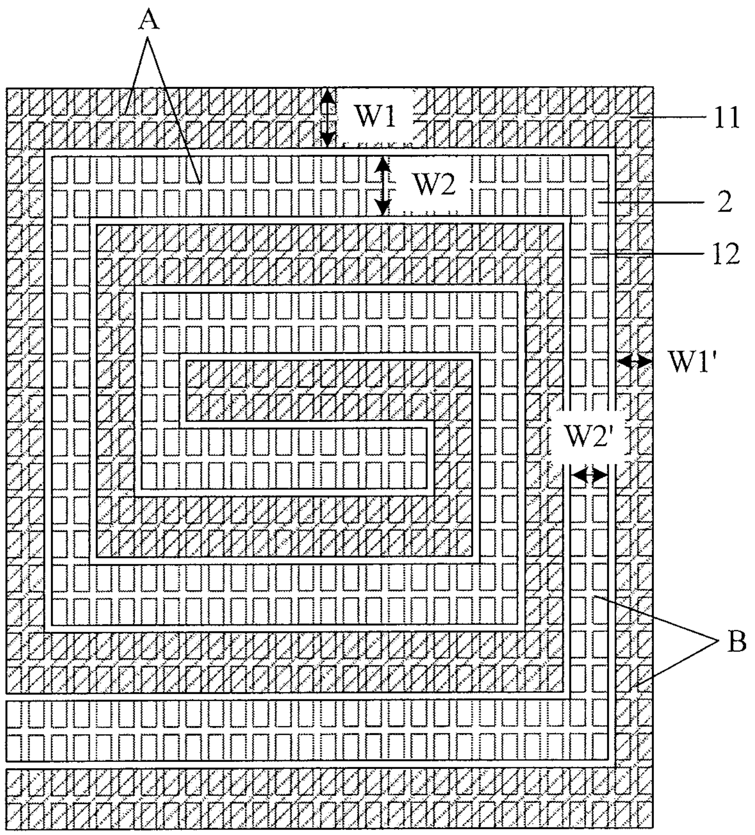
FIG. 4 is a plan view of the touch electrode pair in the embodiment of the present disclosure.

Specifically, when the touch display substrate is further provided with a plurality of sub-pixels 2 arranged in an array as shown in FIG. 4 and the extending direction of the first stripe structure A is the row direction, the width W1 of the first strip structure A included in the first touch electrode 11 and the width W2 of the first stripe structure A included in the second touch electrode 12 may have a correspondence with the sub-pixel 2 so that the touch electrode may be multiplexed as a common electrode during the display period, thereby simplifying the structure of the touch display device. As shown in FIG. 4, the width W1 of the first stripe structure A included in the first touch electrode 11 and the width W2 of the first stripe structure A included in the second touch electrode 12 are the total length of at least one of sub-pixel 2 arranged in order along the column direction, and the interval between the first stripe structure A included in the first touch electrode 11 and the first stripe structure A included in the second touch electrode 12 is an interval between two adjacent rows of sub-pixels 2.

It is known for those skilled in the art that the width W1 of the first stripe structure A included in the first touch electrode 11 and the width W2 of the first stripe structure A included in the second touch electrode 12 will affect the opposite overlapping are of the first touch electrode 11 and the second touch electrode 12, and affect the area occupied by the touch electrode pair 10. The smaller the width W1 of the first stripe structure A included in the first touch electrode 11 and the width W2 of the first stripe structure A included in the second touch electrode 12 are, the larger the opposite overlapping area of the first touch electrode 11 and the second touch electrode 12 is and the smaller the area occupied by the touch electrode pair 10 is, so the greater the difficulty for manufacturing the first touch electrode 11 and the second touch electrode 12. Therefore, it is important to design the width W1 of the first stripe structure A included in the first touch electrode 11 and the width W2 of the first stripe structure A included in the second touch electrode 12. Exemplarily, after considering the difficulty for manufacturing the first touch electrode 11 and the second touch electrode 12, their opposite overlapping area and the area occupied by the touch electrode pair 10, the embodiment of the present disclosure selects situations as shown in FIG. 4, in which the width W1 of the first stripe structure A included in the first touch electrode 11 and the width W2 of the first stripe structure A included in the second touch electrode 12 are the total length of two sub-pixels 2 arranged in order along the column direction.

Similarly, when the touch display substrate is further provided with a plurality of sub-pixels 2 arranged in an array as shown in FIG. 4 and the extending direction of the first stripe structure A is the column direction, the width W1' of the second strip structure B included in the first touch electrode 11 and the width W2' of the second stripe structure B included in the second touch electrode 12 may have a correspondence with the sub-pixel 2 Exemplarily and as shown in FIG. 4, the width W1' of the second stripe structure B included in the first touch electrode 11 and the width W2' of the second stripe structure B included in the second touch electrode 12 are the total length of at least one of sub-pixels 2 arranged in order along the row direction, and the interval between the second stripe structure B included in the first touch electrode 11 and the first stripe structure B included in the second touch electrode 12 is an interval between two adjacent columns of sub-pixels 2.

After considering the difficulty for manufacturing the first touch electrode 11 and the second touch electrode 12, their opposite overlapping area and the area occupied by the touch electrode pair 10, the embodiment of the present disclosure selects the solution as shown in FIG. 4, in which the width W1' of the second stripe structure B included in the first touch electrode 11 and the width W2' of the second stripe structure B included in the second touch electrode 12 are the total length of two sub-pixels 2 arranged in order along the row direction.

In addition, the touch display substrate in the embodiment of the present disclosure may be used as an array substrate or as a color film substrate when it is applied to a touch display device.

Figure 5:
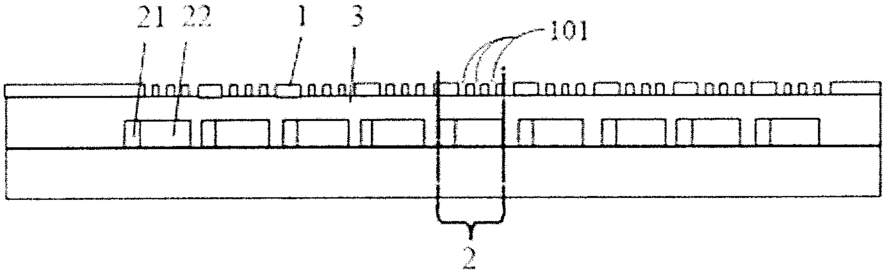
FIG. 5 is a cross-sectional view of an array substrate in an embodiment of the present disclosure.

Specifically, when the touch display substrate is used an array substrate, as shown in FIG. 5, the touch electrode 1 is located on one side of the array substrate facing towards the color film substrate. In the embodiment of the present disclosure, the touch electrode 1 is multiplexed as a common electrode during the display period to simplify the structure of the array substrate, to reduce the number of patterning processes for manufacturing the array substrate, to reduce the difficulty and cost for manufacturing the array substrate and to improve the yield of the array substrate. In addition, it may also avoid the occurrence of a decrease in the aperture ratio caused by manufacturing an opaque metal layer on the array substrate to form the touch electrode 1. Alternatively, as shown in FIG. 5, the array substrate is further provided with a plurality of sub-pixels 2 arranged in an array. Each of the sub-pixels 2 is provided with a thin film transistor 21 and a pixel electrode 22. An insulating layer 3 is provided on the thin film transistor 21 and the pixel electrode 22, and the touch electrode 1 is provided on the insulating layer 3. A portion of the touch electrode 1 located within the sub-pixel has at least on slit 101. The touch electrode 1 is multiplexed as a common electrode during the display period, and the touch display device including the array substrate is display device in a HADS (High Transmittance Advanced Super Field Conversion Technology) display mode, which has a better displaying effect.

Figure 6:
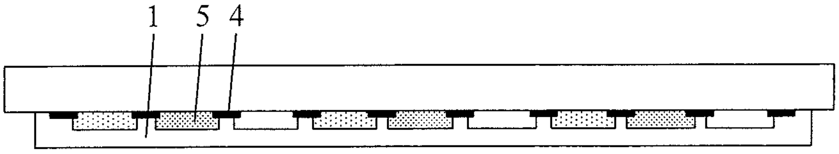
FIG. 6 is a cross-sectional view of a color film substrate in an embodiment of the present disclosure.

When the touch display substrate is a color film substrate, as shown in FIG. 6, the touch electrode 1 is located on one side of the color film substrate facing toward the array substrate. Similarly, in the embodiment of the present disclosure, the touch electrode 1 is multiplexed as a common electrode during the display period. Alternatively, as shown in FIG. 6, a black matrix 4 and a color filter layer 5 are provided on the color film substrate, and the touch electrode 1 is provided on the black matrix 4 and the color filter layer 5. Exemplarily, the color filter layer 5 includes a red region, a green region and a blue region.

Figure 7:
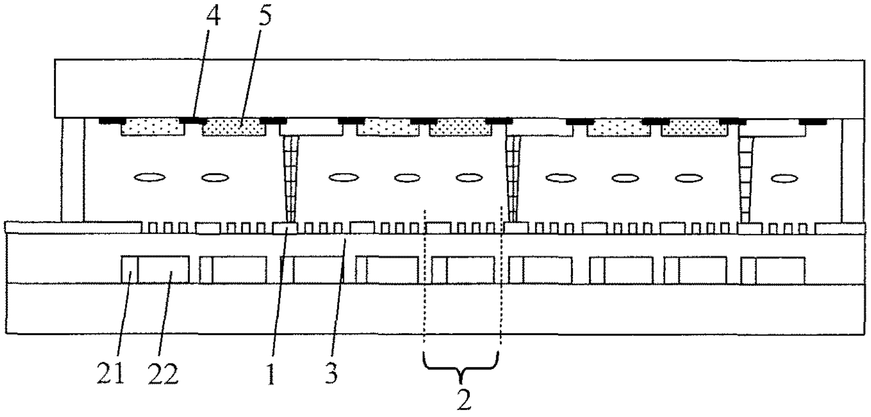
FIG. 7 is a cross-sectional view of a touch display device in an embodiment of the present disclosure.

In addition, the embodiment of the present disclosure further provides a touch display device comprising the touch display substrate as mentioned above. When the touch display substrate is an array substrate, as shown in FIG. 7, the touch display device further comprises a color film substrate opposite to the array substrate and a liquid crystal molecular layer and a spacer located there between. In this case, the structure of the array substrate may be as shown in FIG. 5, and it is not necessary to provide the common electrode on the color film substrate. When the touch display substrate is a color film substrate, the touch display device further comprises an array substrate opposite to the color film substrate, and a liquid crystal molecular layer and a spacer located there between. In this case, the structure of the color film substrate may be as shown in FIG. 6, and it is not necessary to provide the insulating substrate and the common electrode on the array substrate. It should be noted that although it is not shown in the drawings, the above mentioned array substrate has to include gate lines and data lines interleaved vertically and horizontally so as to implement a display function.

Since the touch display device comprises the touch display substrate as mentioned above, the touch display device has the same advantageous effects as that of the touch display substrate as above mentioned and it will not be described again for brevity.

In order to facilitate those skilled in the art to understand the use of the touch display device the following embodiments of the present disclosure will be described in detail with respect to the two driving methods when the touching principle of the touch display device is self-capacitance and mutual-capacitance. Both of the driving methods utilize the touch electrode as a common electrode during the display period as an example.

Figure 8:
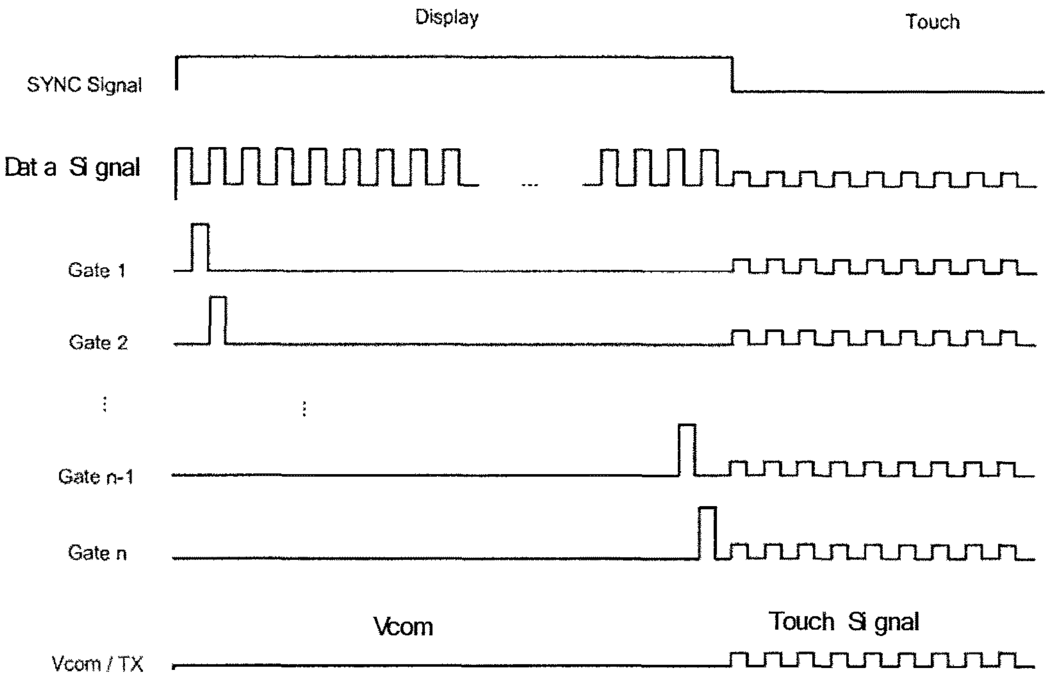
FIG. 8 is a driving timing chart of the touch display device in the embodiment of the present disclosure when the touching principle is to utilize a self-capacitance mode.

Alternatively, when the touching principle of the touch display device is a self-capacitance, as shown in FIG. 8, the driving method comprises dividing each frame into a display time period (shown as Display in FIG. 8) and a touch time period (shown as Touch in FIG. 8). During the display period, a common electrode signal (shown as Vcom in FIG. 8) is applied to the touch electrode, and exemplarily the common electrode signal may be a DC signal. At the same time, during the display period, a vertical scanning signal (SYNC signal shown in FIG. 8) is at a high level, and the first gate line (shown as Gate 1 in FIG. 8) to the $n^{th}$ gate line (shown as Gate n in FIG. 8) are turned on row by row, and the display data signal is applied to the data line (shown as Data Signal in FIG. 8). During the touch time period, the touch drive circuit applies a touch signal (shown as Touch Signal in FIG. 8) to all of the touch electrodes and determines the touch position by detecting the change in the capacitance value of the respective touch electrode. Exemplarily, the touch detection signal is a periodic pulse signal. Since the vertical scanning signal is at low level during the touch time period, the signal having the same waveform as that of the touch signal is loaded to each of the gate lines and each of the data lines, which in turn effectively prevents the signals load on the gate line and the data line from affecting the signal loaded on the touch electrode. Thus, the sensitivity of the touch display device is further improved, the power consumption of the touch display device is reduced, and the touch performance of the touch display device is improved.

Figure 9:
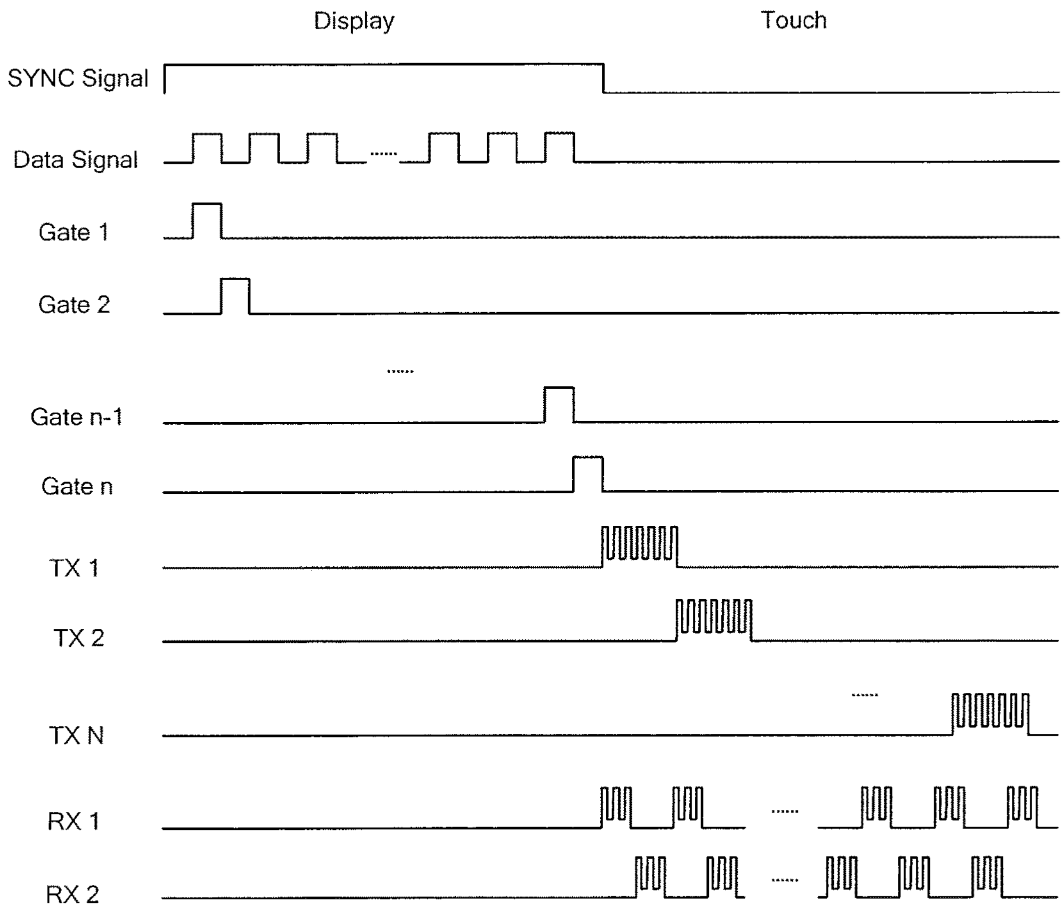
FIG. 9 is a timing chart of the touch display device in the embodiment of the present disclosure when the touching principle is to utilize a mutual capacitance mode.

Alternatively, when the touching principle of the touch display device is a mutual capacitance, as shown in FIG. 9, the driving method comprises dividing each frame into a display time period (shown as Display in FIG. 9) and a touch time period (shown as Touch in FIG. 9). During the display period, a common electrode signal is applied to all of the touch electrodes, and the common electrode signal may be a DC signal. At the same time, during the display time period, the vertical scanning signal (shown as SYNC signal in FIG. 9) is at a high level, and the first gate line (shown as Gate 1 in FIG. 9) to the $n^{th}$ gate line (shown as Gate n) in FIG. 9 are turned on row by row, and the display data signal (Data Signal as shown in FIG. 9) is applied to the data line. In the touch time period, a driving signal is sequentially applied to the driving electrode (shown as TX1 to TXN in FIG. 9) by the touch driving circuit, and an inductive signal is alternately applied to the receiving electrode (shown as RX1 and RX2 in FIG. 9) and the touch position is determined by detecting a change in the inductive signal on the receiving electrode. Exemplarily, the drive signal and the sense signal may be periodic pulse signals.

The contents as mentioned above are only specific embodiments of the present invention, but the scope of the present invention is not limited thereto. All of the changes and modification which are appreciated for those skilled in the art within the scope of the present invention fall within the scope of the present invention. The scope of the present invention should be defined based on the claims.

We claim:

1. A touch display substrate comprising a plurality of touch electrodes, wherein the plurality of touch electrodes are divided into at least one touch electrode pair; each of the touch electrode pair includes first and second touch electrodes which are adjacent to each other; the first touch electrode comprises a plurality of bending portions; the second touch electrode comprises a plurality of bending portions; the bending portions of the first touch electrode and the corresponding bending portions of the second touch electrode are matched with each other at positions;

wherein the first touch electrode and the second touch electrode both have spiral shapes, and the first touch electrode and the second touch electrode are nested with each other;

wherein the first touch electrode has a square spiral shape, and the second touch electrode has a square spiral shape, and the first touch electrode and the second touch electrode are nested with each other;

wherein the first touch electrode and the second touch electrode both include a plurality of first strip structures and a plurality of second strip structures extending along directions perpendicular to each other; the plurality of first stripe structures and the plurality of second stripe structures included in the first touch electrodes are alternately connected to each other end to end to form a square helical shape, and the plurality of first stripe structures and the plurality of second stripe structures included in the second touch electrodes are alternately connected to each other end to end to form a square helical shape; and wherein the touch display substrate further comprises a plurality of sub-pixels arranged in an array, the extending direction of the first strip structure is a row direction of the array, the width of the first strip structure is the total length of at least one of the sub-pixels arranged in a column direction of the array, and an interval between the first stripe structures included in the first touch electrode and the first strip structure included in the second touch electrode is an interval between the two adjacent rows of the sub-pixels.

2. The touch display substrate according to claim 1, wherein the width of the first strip structure is the total length of two sub-pixels arranged in the column direction.

3. The touch display substrate according to claim 1, further comprising a plurality of sub-pixels arranged in an array in which the extending direction of the second stripe structure is a column direction of the array, the width of the second stripe structure is the total width of at least one of the sub-pixels arranged in order along the row direction of the array, and an interval between the second stripe structures included in the first touch electrode and the second strip structure included in the second touch electrode is an interval between the two adjacent columns of the sub-pixels.

4. The touch display substrate according to claim 3, wherein the width of the second stripe structure is the total width of two sub-pixels arranged in order along the row direction.

5. The touch display substrate according to claim 1, wherein an area occupied by each of the touch electrode pair is the same as or close to that of one touch portion.

6. The touch display substrate according to claim 1, wherein the area occupied by the plurality of adjacent touch electrode pairs is the same as or close to that of one touch portion.

7. The touch display substrate according to claim 1, wherein the first touch electrode and the second touch electrode in each of the touch electrode pair are self-capacitance electrodes.

8. The touch display substrate according to claim 1, wherein the first touch electrode in each of the touch electrode pair is a driving electrode and the second touch electrode is a receiving electrode.

9. The touch display substrate according to claim 1, wherein the touch display substrate is an array substrate and the touch electrode is located on one side of the array substrate toward a color film substrate.

10. The touch display substrate according to claim 9, wherein a plurality of sub-pixels arranged in an array is further provided on the array substrate; each of the sub-pixels is provided with a thin film transistor and a pixel electrode; an insulating layer is provided on the thin film transistor and the pixel electrode; the touch electrode is provided on the insulating layer, and a slit is provided on a portion of the touch electrode located within the sub-pixel.

11. The touch display substrate according to claim 1, wherein the touch display substrate is a color film substrate and the touch electrode is located on one side of the color film substrate facing toward the array substrate.

12. The touch display substrate according to claim 11, wherein the color film substrate is further provided with a black matrix and the touch electrode is provided on the black matrix and the color filter layer.

13. A touch display device comprising the touch display substrate according to claim 1.

* * * * *